H. R. STANDEFER.
AUTOMATIC WEIGHING SCALE.
APPLICATION FILED AUG. 30, 1920.

1,425,911.

Patented Aug. 15, 1922.
2 SHEETS—SHEET 1.

INVENTOR
H. R. Standefer
BY John M. Spellman
ATTORNEY

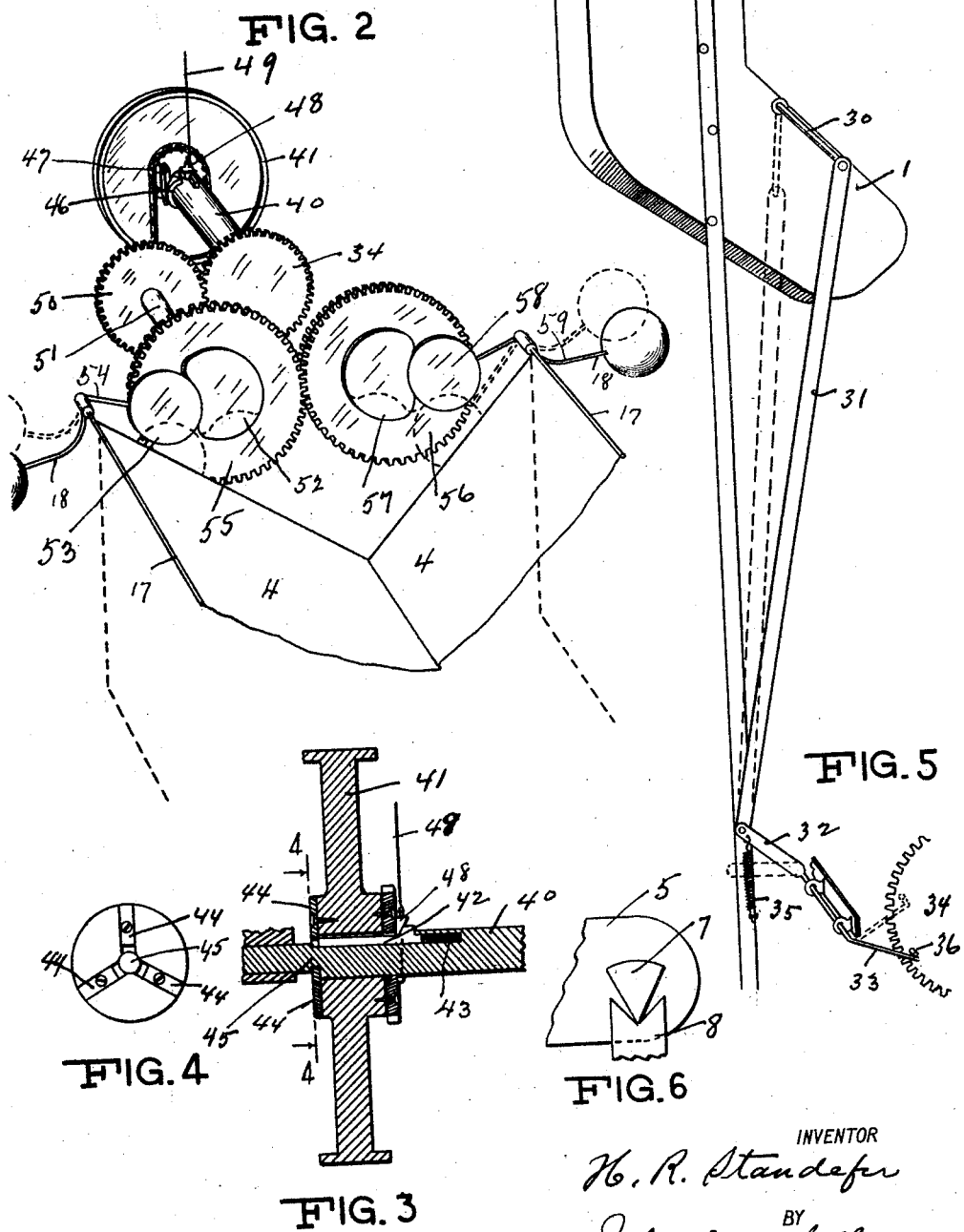

UNITED STATES PATENT OFFICE.

HENRY R. STANDEFER, OF MELVIN, TEXAS.

AUTOMATIC WEIGHING SCALE.

1,425,911.

Specification of Letters Patent. Patented Aug. 15, 1922.

Application filed August 30, 1920. Serial No. 407,067.

*To all whom it may concern:*

Be it known that I, HENRY R. STANDEFER, citizen of the United States, residing at Melvin, in the county of McCulloch and State of Texas, have invented certain new and useful Improvements in Automatic Weighing Scales, of which the following is a specification.

My invention has relation to improvements in automatic weighing scales and has particular relation to improvements in that type of weighing scales set forth and claimed in my Letters Patent #1,046,885 and dated December 10, 1912.

In the scales described and claimed in said Letters Patent, a receiver is suspended from one end of a scale beam which beam constitutes the sole support of the receiver. The receiver when filled with a prescribed quantity of material tilts the scale beam and the upward movement of the weighted end of said beam operates through a series of levers, a means for opening the discharge end of the receiver and a means for shutting off the flow of material to the receiver, the two means being timed so that the flow of material to the receiver ceases at or before the discharge from said receiver. My present invention contemplates amongst other things the improvement of the scales of my patent in certain important particulars, namely,—the supporting of the receiver and the arrangement and construction of the means for shutting off the flow to the receiver and the means for opening the discharge from said receiver.

Thus in my present invention the receiver is supported in a rectangular frame, the frame supporting the receiver in an upright position and preventing the wobbling of the receiver during the up and down movement of said receiver, and said frame is operatively connected with the scale beam. Again the means for shutting off the flow of material to the receiver as well as the means for permitting of the discharge of material from said receiver are simplified in construction and arrangement.

The nature and scope of my invention will be more fully understood from the following description taken in connection with the accompanying drawings forming part hereof, in which—

Figure 2 is a perspective view of the mechanism for opening and closing the discharge gates or doors of the receiver.

Figure 3 is a longitudinal sectional view illustrating the clutch.

Figure 4 is a view taken on the line 4—4 of Figure 3.

Figure 5 is a perspective view of the mechanism for opening and closing the delivery chute feeding the receiver and Figure 6 is a detail view of one of the knife edge supports for the frame which supports the receiver.

Figure 1:
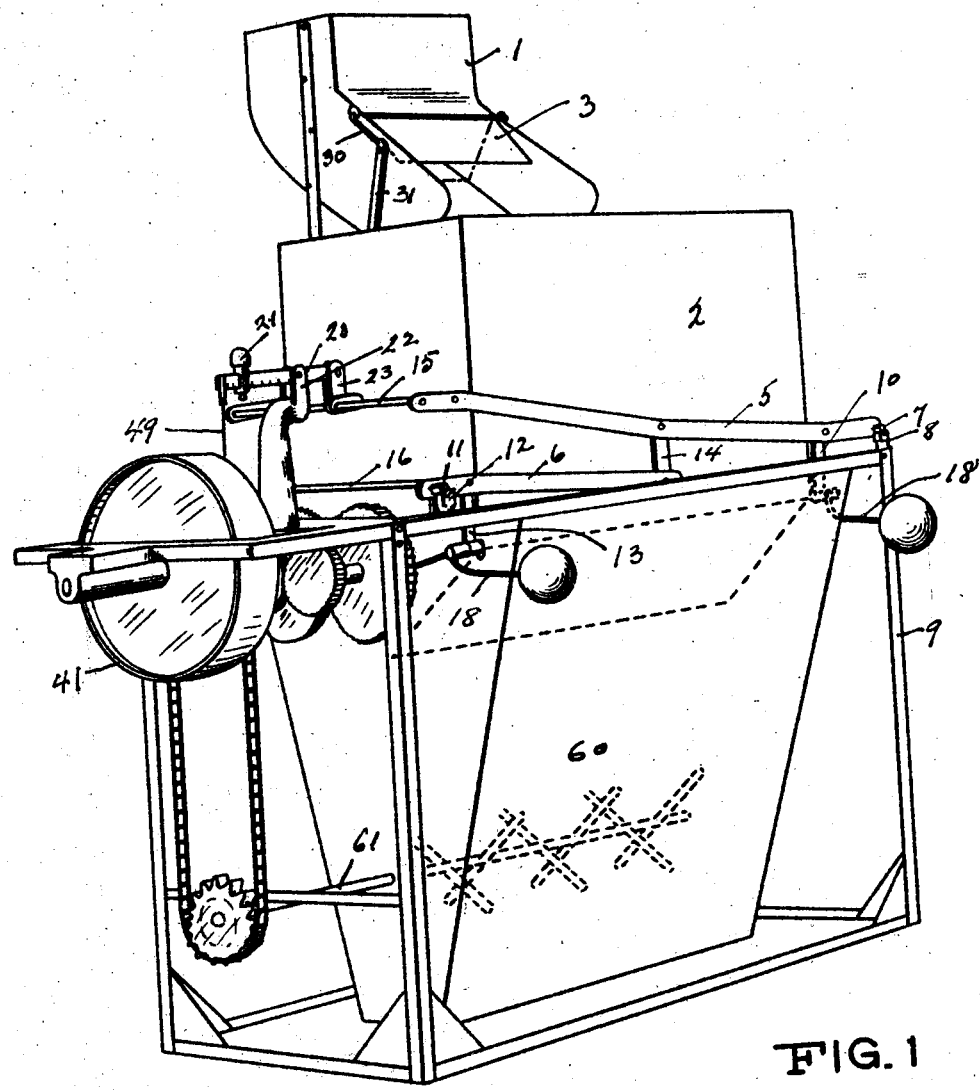
Figure 1 is a perspective view of an automatic weighing scales embodying the main features of my invention.

Referring to the drawings, 1 represents a discharge chute for the conveyance of grain, cotton seed or similar material to a weighing bin or receiver 2. The passage of material through chute 1 is controlled by a gate in the form of a hinged door 3 and such material is supplied from a bin or receptacle not shown. The bin or receiver 2 is in the form of a box open at its upper side and normally closed at its base by two wings or hinged doors 4 opening outwardly. The receiver 2 is supported within a frame consisting of two lever arms 5 and 6 arranged at either side of the receiver, each upper arm being provided at its rear end (to the right in Figure 1) with a knife edge bearing 7 fitting in a complementally recessed lug or block 8 formed at the rear corners of a main frame 9. Each lower rear corner of the receiver is connected with an upper lever arm 5 through strap 10 extending downwards from said arm.

Each lower lever arm 6 is pivoted at its forward end said pivot being a knife edge bearing 11 similar to the bearing 7 but resting in a recessed block 12 formed at the front upper corners of the main frame 9. The lower lever arms 6 are connected to the forward corners of receiver 3 by straps 13.

The two levers 5 and 6 are connected intermediate of their ends by a strap or link 14.

The two upper arms 5 are connected together at their forward ends by a rod 15 and at the rear ends by a similar rod not shown, the receiver 2 thus being enclosed within the two arms 5 and the connecting rods. For the purpose of strengthening and stabilizing the lower arms 6, a rod 16 connects said arms at a point to the rear of the front knife edge bearings 11.

Each door 4 is connected with a pintle 17 to the ends of which counter balancing arms 18 are secured, the weights on said arms tending normally to hold the doors 4 closed. The receiver 2 with its supporting arms 5 and 6 are held in raised position by the scale beam 20 having a sliding weight or pea 21 and pivoted or fulcrumed intermediate of its ends in the support 22. To so hold the receiver 2 in its upright position the unweighted end of the beam 20 is preferably connected by links or strips 23 with the rod 15. The weight 21 may be slid back and forth on the beam 20 to measure the weight of material accumulating in receiver necessary to tilt said beam and thus force the receiver downward. This movement downward of the receiver sets in motion the mechanism for closing the gate or hinged door 3 in chute 1 and the mechanism for opening the counterweighted doors or wings 4 at the base of the receiver.

Referring now to Figure 5, the gate 3 has a crank arm 30 connected with one end of a link 31, the other end of said link 31 being connected with a crank lever 32. The lever 32 has an end or arm 33 projecting inwards against the periphery of a gear wheel 34. A spring 35 normally tends to draw the link 31 downwardly to shut the gate, but a stop pin 36 on the wheel 34 normally impinges upon the arm 33 to hold said crank lever 32 and link 31 upwards against the tension of spring 35 to open the gate. When gear wheel 34 starts to revolve the end 33 of crank lever 32 slips past the stop pin 36 and the spring 35 draws down the link 31 to shut the gate 4.

The gear wheel 34 is keyed to a stub shaft 40 which is arranged to be locked to or released from a constantly rotating driving wheel 41 through the medium of a key or bolt 42 working in a slot of shaft 40 and held towards locking position by a spring 43. The driving wheel 41 carries a number of locking plates 44 revolving about the reduced end 45 of shaft 40 and said plates 44 are secured to the hub of wheel 41 in radial relationship with their lower ends projecting towards but separated some distance from the shaft end 45. When bolt 42 is projected under tension of its spring 43 it will enter between one of the plates 44 and reduced end 45 to lock the shaft 40 to the wheel 41. A cam plate 46 carried by the bolt 42 and encircling the shaft 40 (see Figure 2) cooperates with a stationary bar 47 to draw the bolt 42 backwards against its spring and a wedge 48 suspended by a cord 49 from the weighted end of scale beam 20 serves when lowered to lock the bolt in retracted position. The scale beam 20 when tilted upwards by the fall of the receiver 2 lifts the wedge 48 from the bolt and said bolt shoots into locking engagement with the hub of the driving wheel 41 thus setting in motion the gear wheel 34 to shut the gate 3.

The gear wheel 34 is in mesh with a pinion 50 on a shaft 51 which carries a heart shaped cam 52 operating on a disk 53 carried by an arm 54 or circular plate 53 carried by an arm 54 projecting from the pintle or rod 17 of a door 4. The shaft 51 as it revolves turns the cam 52, to successively, through disk 53, lower and raise the arm 54 to thereby open and through weighted balancing arms 18 close the door 4. The shaft 51 has a gear 55 in mesh with a similar gear 56 carrying a duplicate cam 57 operating a disk 58 controlling through arm 59 the movement of the other door 4. The cams 52 and 57 being reversely arranged the two doors 4 are operated to open or close as required, when the gear 34 is locked to the driving wheel 41.

The receiver 2 discharges when doors 4 are opened into a chamber 60 tapering towards its base. In chamber 60 revolves an agitator shaft 61. The chamber 60 in turn empties into bags or a conveyor not shown.

Having thus described the nature and objects of my invention, what I claim as new and desire to secure by Letters Patent is—

1. In an automatic weighing scales, a receiver, a chute leading downwardly into the receiver, a gate in said chute for control and admission of material into the receiver, discharge doors arranged at the bottom of the receiver, arms connected with the lower corners of the receiver to support the same, knife edge bearings for each of said arms, a scale beam, a means for suspending the receiver through said arms from one end of said scale beam, and means controlled by the movement of the other end of said beam whereby when said receiver lowers under its measured load said chute gate is closed and the discharge doors of the receiver are opened.

2. In an automatic weighing scales, a receiver, discharge doors swinging outward from the bottom of said receiver, a pintle for each door, a counterweighted arm connected to each pintle to close its said door, an arm and disk connected to each pintle and a periodically operated heart shaped cam cooperating with each disk to lower and raise the disk arm and thereby open and close said door.

In testimony whereof I have signed my name to this specification.

HENRY R. STANDEFER.